(12) United States Patent
Wakabayashi et al.

(10) Patent No.: US 7,740,174 B2
(45) Date of Patent: Jun. 22, 2010

(54) MANUAL NONCONTACT IC CARD READER

(75) Inventors: Naoyuki Wakabayashi, Osaka (JP); Akihiro Tadamasa, Seto (JP)

(73) Assignee: Hitachi-Omron Terminal Solutions, Corp., Tokyo (JP)

( * ) Notice: Subject to any disclaimer, the term of this patent is extended or adjusted under 35 U.S.C. 154(b) by 2 days.

(21) Appl. No.: 12/000,668

(22) Filed: Dec. 14, 2007

(65) Prior Publication Data

US 2008/0203163 A1 Aug. 28, 2008

(30) Foreign Application Priority Data

Feb. 27, 2007 (JP) .............................. 2007-046503

(51) Int. Cl.
*G06K 7/08* (2006.01)

(52) U.S. Cl. ...................... 235/451; 235/449

(58) Field of Classification Search ................ 235/440, 235/449, 451, 492, 493
See application file for complete search history.

(56) References Cited

U.S. PATENT DOCUMENTS

| 5,583,330 | A | 12/1996 | Fallah et al. | |
|---|---|---|---|---|
| 6,703,935 | B1 * | 3/2004 | Chung et al. | 340/572.7 |
| 6,839,772 | B1 | 1/2005 | Kowalski et al. | |
| 7,132,997 | B2 * | 11/2006 | Uesaka et al. | 343/867 |
| 2005/0173531 | A1 * | 8/2005 | Yoshioka | 235/451 |

FOREIGN PATENT DOCUMENTS

| EP | 1 035 492 A1 | 9/2000 |
|---|---|---|
| EP | 1 441 311 A2 | 1/2004 |
| JP | 2000-172794 | 6/2000 |
| JP | 2001-256446 | 9/2001 |
| JP | 2003157411 A * | 5/2003 |
| JP | 2003-223619 | 8/2003 |
| JP | 2005-94561 | 4/2005 |
| WO | WO 87/02806 | 5/1987 |
| WO | WO 97-34249 | 9/1997 |

OTHER PUBLICATIONS

European Search Report issued in European Patent Application No. EP 07023670.8 dated on Jun. 27, 2008.

* cited by examiner

*Primary Examiner*—Karl D. Frech
(74) *Attorney, Agent, or Firm*—McDermot Will & Emery LLP (57) ABSTRACT

A technology that is applicable generally to manual noncontact card readers regardless of whether they are of insertion or swipe type, and realizes stable communication even with antennas of small size is provided. A pair of loop antennas is located in opposition to either side of a transport path, in proximity to a card insertion slot of the transport path. A magnetic circuit which connects the loop antennas together is located so as to not lie exposed in the transport path, so that, of the magnetic fluxes produced in two directions with respect to the noncontact card from the loop antennas, one of these will be diverted through the magnetic circuit without interlinking to the card.

10 Claims, 10 Drawing Sheets

A-A cross section

A-A cross section

Fig.12(d)

B-B cross section

Fig.14

MANUAL NONCONTACT IC CARD READER

The present application claims priority from Japanese application JP2007-046503 filed on Feb. 27, 2007, the content of which is hereby incorporated by reference into this application.

BACKGROUND OF THE INVENTION

The present invention relates to a manual noncontact card reader for use in, for example, an entry and exit management system.

Card readers are generally classified motor-driven types and manual types. The motor-driven type card reader draws the card into the inside automatically by a motor-driven transport mechanism so that card information can be read. The manual type card reader manipulates the card by hand so that card information can be read. Manual type card readers are further classified as swipe type card readers which read information as the card is fed in one direction by hand, and insertion type card readers which read information by manually inserting the card into an insertion slot and then withdrawing the card.

While systems such as entry-exit management systems to date have mainly employed manual type card readers that use magnetic cards, more recently, noncontact cards, which can read information without contact by simply holding the card in a prescribed location of a unit, have come to rapidly replace magnetic cards. Given these circumstances, it is inevitable that there should be increasing demand for a manual noncontact card reader capable of handling a noncontact card through an operation that feels similar to using a conventional magnetic card.

However, with manual noncontact card readers, unlike motor-driven types, the card is manipulated by hand, and thus in some instances the card will not be transported at a uniform speed, making it difficult to accurately read the data. Moreover, with swipe type units, since only part of the card passes through the card transport path, the opposed areas of the antenna on the reader side and the antenna on the card side are of small dimensions, creating the problem of poor transfer efficiency and inconsistent communication between the two.

In one insertion type noncontact card reader, detecting modules are provided for detecting that a noncontact card has been placed at a fixed position at which stable communication with the antenna can take place; and communication with the noncontact card is initiated if the detecting module has detected that the noncontact card at the fixed position, whereby noncontact communication can take place stably and reliably.

In one swipe type noncontact card reader, a guide for temporary stop is provided at the terminal end of the card transport path, and a card removal unit is provided to a side thereof. With the noncontact card having been conveyed manually into initial contact with the guide for temporary stop, the card will communicate with an antenna on the reader side. The transport direction of the card will then change sideways so that the card is removed from the card removal unit, so as to make stable communication possible.

Another example of a swipe noncontact card reader has a pair of antennas that are provided to either side of the card transport path. The width of the opening of the transport path is made slightly shorter than the length of the short side of the card, while the depth of the opening of the transport path is equal in length to or longer than the short side of the card, whereby as the card is being swiped the card will become adjacent to at least one of the pair of antennas at a given angle, making sufficient power supply and communication possible.

A noncontact card reader having antennas for card detection positioned to either side of a card insertion slot is known. With this card reader, the noncontact card will be detected in front of the card insertion slot by orienting the plane of the antenna perpendicular to the card insertion direction. With this card reader, interlinkage of magnetic flux at the front side with the card will not be weakened by magnetic flux to the back side by providing a magnetic body that constitutes a magnetic path for magnetic flux to the back side of the antenna. Consequently, a state of good communication can be maintained.

As discussed above, various designs are employed for the purpose of enabling stable communication between the noncontact card and the card reader. However, the technology for the insertion type card readers cannot be implemented in swipe type or other card reader that lacks a fixed position where stable communication with the antenna can take place.

In the one swipe type card readers, owing to the special construction employed for the purpose of changing the card transport direction at midpoint, it would not be possible to implement the design in a swipe card reader that has a fixed transport direction. In another swipe type card readers, while the transport direction is fixed, it is necessary to make the width of the opening of the transport path slightly shorter than the length of the short side of the card and to make the depth equal in length to or longer than the short side of the card. The limitations imposed by this particular structure pose an obstacle to implementation in swipe card readers generally.

The noncontact card reader is a motor-driven rather than a manual card reader, and thus does not have the problems characteristic to manual card readers such as those discussed above. In this noncontact card reader, the antennas disposed to either side of the card insertion slot constitute antennas for card detection for the purpose of opening a shutter. The antenna for reading information from the card is disposed at a separate location further along the transport path. However, in a manual card reader, if an antenna for reading the card were disposed further along the transport path in this way, since the speed of the card as it passes the antenna location will be faster than that at initial insertion, an antenna of large planar dimensions will be necessary for stable communication between the antenna and the card. Therefore, it will be difficult to install such a large antenna in the limited space of a compact card reader.

SUMMARY OF THE INVENTION

With the foregoing in view, there is a need for technology which is applicable generally to manual noncontact card readers, regardless whether insertion or swipe type, and provides stable communication even with antennas of small size.

The present invention provides a manual noncontact card reader comprising a card insertion slot for inserting a noncontact card. The manual noncontact card reader of the present invention includes a transport path through which is manually transported a noncontact card inserted into the card insertion slot; and reading module for noncontact reading of information recorded on the noncontact card, and includes a pair of loop antennas disposed in opposition to either side of the transport path in proximity to the card insertion slot of the transport path; and a magnetic circuit connecting the loop antennas that is located so as to not lie exposed in the transport path.

In the case of a manual noncontact card reader (especially one of swipe type), the transport speed of the card is slower in the initial stage of inserting the noncontact card through the card insertion slot, and thus by locating the loop antennas in proximity to the card insertion slot as described above, communication between the loop antennas on the card reader side and a loop antenna on the noncontact card side may take place with the card moving at slow speed. A state of stable communication between the two is achieved thereby, and the information recorded on the noncontact card may be read accurately, even if the loop antennas on the card reader side are small. Furthermore, by connecting the loop antennas through a magnetic circuit which does not lie exposed within the transport path, of the magnetic fluxes produced in two directions with respect to the noncontact card from the loop antennas, one of them will be diverted through the magnetic circuit without interlinking to the card, and thus the magnetic flux interlinking with the card is constituted by magnetic flux in one direction only, thereby avoiding weakening of the interlinked magnetic flux. Accordingly, high transfer efficiency is achieved and, coupled with the fact that communication takes place with the card moving at slow speed as mentioned above, it is possible for communication to take place in a reliable manner even where small loop antennas are used. Furthermore, since there are no limitations as to the noncontact card transport direction or structure of the transport path, implementation is possible generally in a wide range of manual noncontact card readers.

Moreover, in the present invention, there may be provided, in addition to the loop antennas, a pair of second loop antennas disposed to either side of the card insertion slot with the antenna plane approximately perpendicular to the card insertion direction. In this case as well, the magnetic circuit connecting the second loop antennas to one another will be located so as to not lie exposed in the transport path.

As mentioned above, in the initial stage of card insertion the card transport speed is slow and thus a longer communication interval may be assured by initiating communication with the card while in proximity to the card insertion slot. Thus, where the second loop antennas are located to either side of the card insertion slot, generation of magnetic flux and interlinkage thereof with the card may take place to the front of the insertion slot, thereby ensuring a communication period of sufficient duration so that more stable communication may take place. Moreover, because the respective loop antennas are disposed to either side of the card insertion slot and in proximity to the card insertion slot of the transport path, the magnetic field generated by the loop antennas will be quite strong, and high transfer efficiency with the noncontact card may be achieved despite small size of each antenna.

Furthermore, in the present invention, in place of the pair of loop antennas described above, a loop antenna and a magnetic body may be disposed in opposition to either side of the transport path in proximity to the card insertion slot of the transport path. In this case as well, the magnetic circuit connecting the loop antenna and the magnetic body will be located so as to not lie exposed in the transport path.

Furthermore, in the present invention, in place of the pair of loop antennas described above, a pair of magnetic bodies may be disposed in opposition to either side of the transport path in proximity to the card insertion slot of the transport path, and a coil producing a magnetic field may be disposed between the magnetic bodies. In this case as well, the magnetic circuits connecting the coil and the magnetic bodies will be located so as to not lie exposed in the transport path.

According to the present invention, since communication with the antennas takes place with the card moving at slow speed during initial insertion of the noncontact card, card information may be read accurately through stable communication, even where the antennas on the card reader side are small. Moreover, as the present invention involves no limitations as to the card transport direction or structure of the transport path, implementation is possible generally in a wide range of manual noncontact card readers, whether of insertion type or swipe type.

BRIEF DESCRIPTION OF THE DRAWINGS

Preferred embodiments of the present invention will now be described in conjunction with the accompanying drawings, in which:

FIGS. 2($a$) and 2($b$) show a perspective view depicting another example of a card;

FIGS. 4($a$) to 4($c$) show the structure of the main section in a card reader;

FIGS. 7($a$) and 7($b$) show the function of a magnetic circuit;

FIGS. 8($a$) and 8($b$) show depicting other embodiments of the present invention;

FIGS. 9($a$) and 9($b$) show depicting other embodiments of the present invention;

FIGS. 12($a$) to 12($d$) show the structure of the main section in a card reader;

FIGS. 13($a$) and 13($b$) show the function of a magnetic circuit; and

DESCRIPTION OF THE PREFERRED EMBODIMENTS

Figure 1:
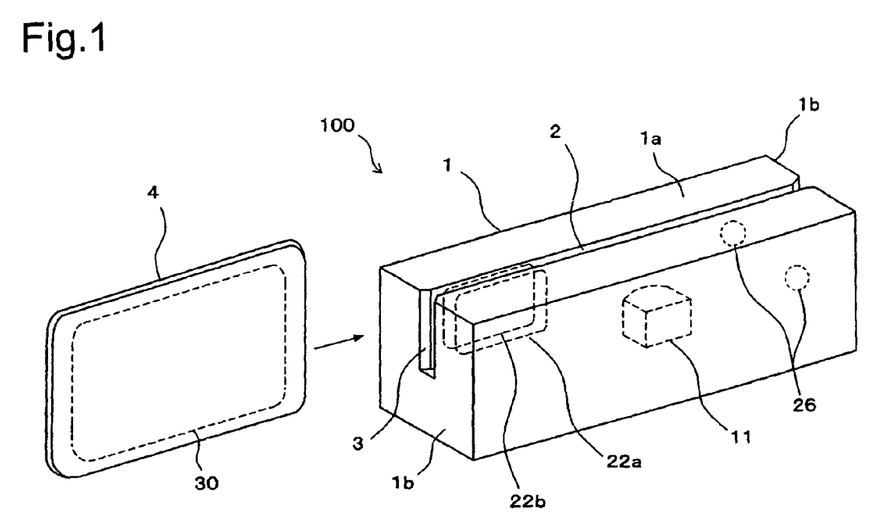
FIG. 1 is a perspective view showing a card reader pertaining to an embodiment of the present invention.

The preferred embodiments of the present invention will be described in detail below with reference to the accompanying drawings. FIG. 1 is a perspective view showing a manual noncontact card reader (hereinbelow termed simply "card reader") pertaining to an embodiment of the present invention. 100 denotes a swipe type card reader having a card transport path 2 formed in a main body 1. This transport path 2 opens onto the upper face 1$a$ of the main body 1 as well as onto both end faces 1$b$; the opening on a first end face 1$b$ of the main body 1 constitutes a card insertion slot 3 for inserting a card 4 in the direction of the arrow. The card 4 is a noncontact card furnished with a loop antenna 30. A pair of loop antennas 22$a$ and 22$b$ for communicating with the loop antenna 30 of the noncontact card 4. The pair of loop antennas 22$a$ and 22$b$ is disposed in opposition across the transport path 2 in proximity to the card insertion slot 3 of the transport path 2. Accordingly, the antenna plane of each of the loop antennas is approximately parallel to the card insertion direction.

Figure 2A:
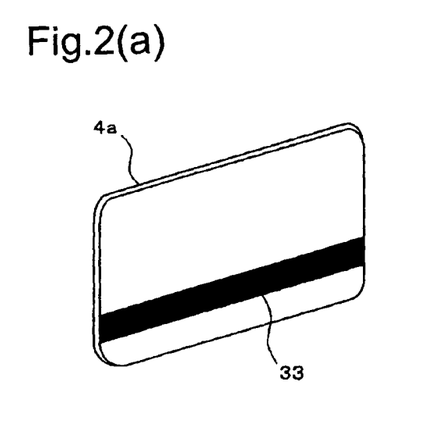
Figure 2B:
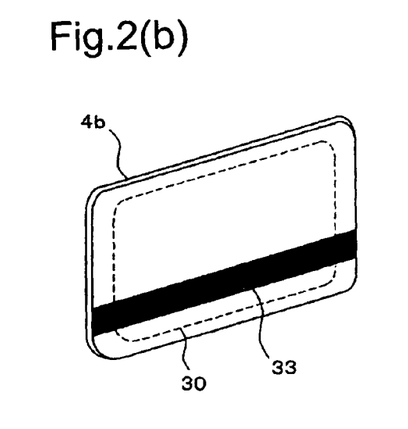

For the purpose of compatibility not only with the noncontact card 4 but also with a magnetic card 4$a$ provided with a magnetic stripe 33 as shown in FIG. 2($a$), or with a hybrid card 4$b$ provided with both a loop antenna 30 and a magnetic stripe 33 as shown in FIG. 2(b). The card reader 100 is also furnished with a magnetic head 11 for reading information from the magnetic stripe 33. A card detecting sensor 26 is located at the back part of the card transport path 2 (on the side thereof opposite from the card insertion slot 3). The card detecting sensor 26 constitutes detectors for detecting that the noncontact card 4 moved manually through the card transport path 2 has reached a prescribed location. This sensor 26 could be a photosensor that includes a light emitting element and a photoreceptor element disposed in opposition to either side of the transport path 2, for example. A micro switch or the like could be used in place of a photosensor as the sensor 26.

Figure 3:
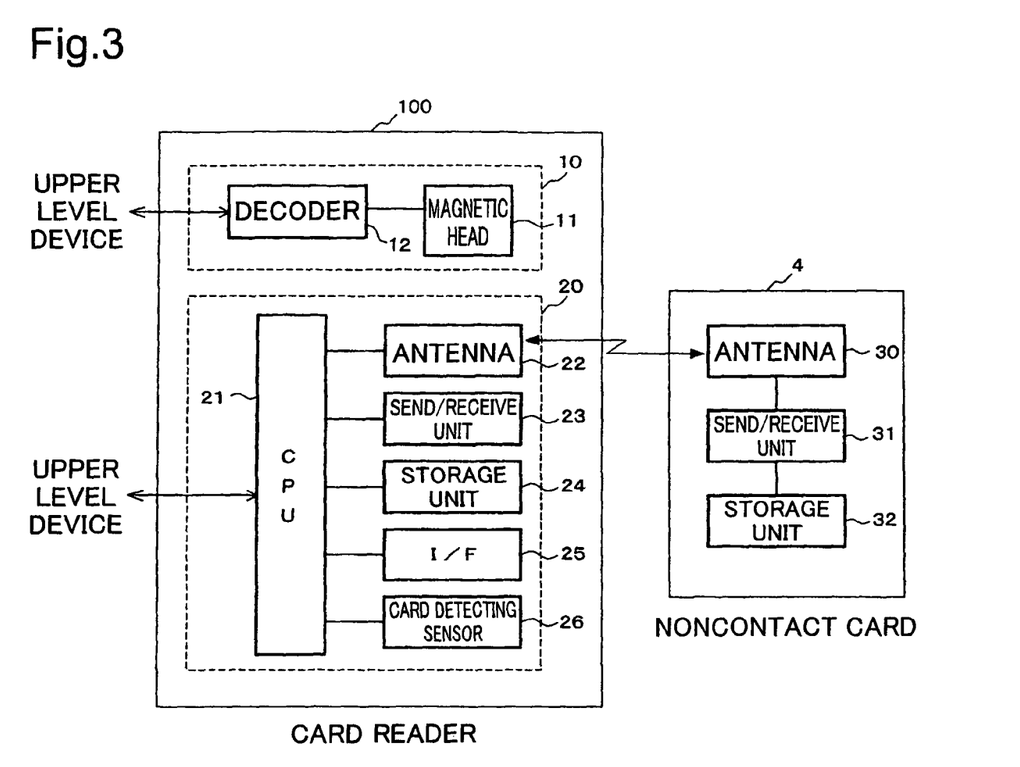
FIG. 3 is an electrical block diagram of a card reader and a noncontact card.

FIG. 3 is an electrical block diagram of the card reader 100 and the noncontact card 4. The card reader 100 has a magnetic block 10 and a noncontact block 20. The magnetic block 10 includes magnetic head 11 and a decoder 12 for decoding magnetic information read by the magnetic head 11. The decoder 12 is connected to a higher level device (not shown) such as an entry-exit management device or transaction processing device. The noncontact block 20 includes a CPU 21 constituting the controller unit, loop antennas 22 composed of the loop antennas 22a, 22b, a send/receive unit 23 for sending and receiving data to and from the noncontact card 4 via the loop antennas 22, a storage unit 22 composed of ROM having a control program and the like stored therein, and RAM for temporary storage, an interface circuit 25 for connection to an external device, and the card detecting sensor 26. The loop antennas 22 (22a, 22b) and the send/receive unit 23 constitute one embodiment of the element of the reading module in the present invention. The noncontact card 4 includes the loop antenna 30, a send/receive unit 31 for sending and receiving data to and from the card reader 100 via the loop antenna 30, and a storage unit 32 for storing card information. While the magnetic head block 10 and the noncontact block 20 are furnished with a power supply circuit and the like in addition to the circuits discussed above, those blocks have no direct bearing on the present invention and accordingly have been omitted from the drawings.

Figure 4A:
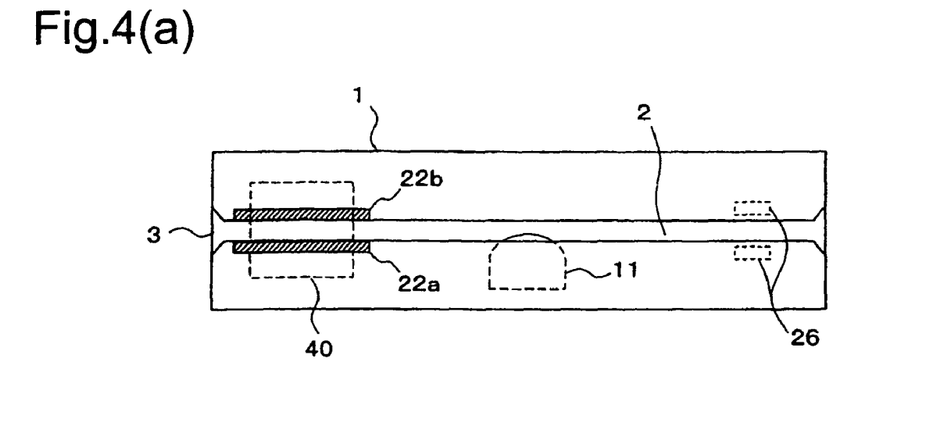
Figure 4B:
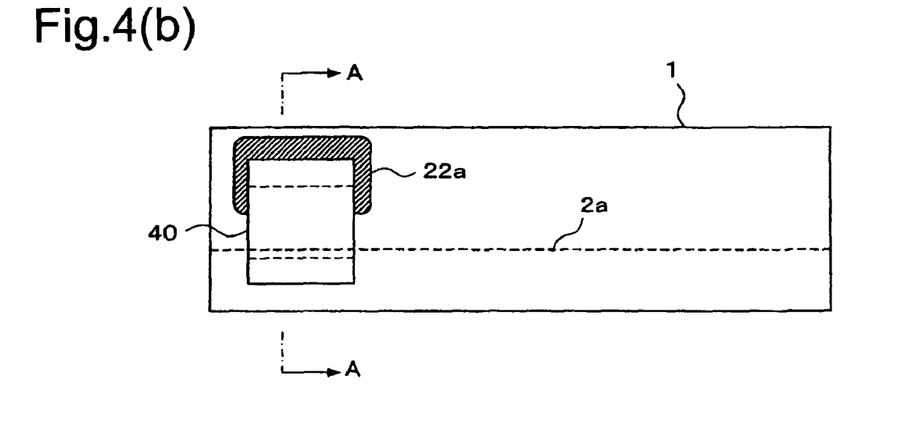
Figure 4C:
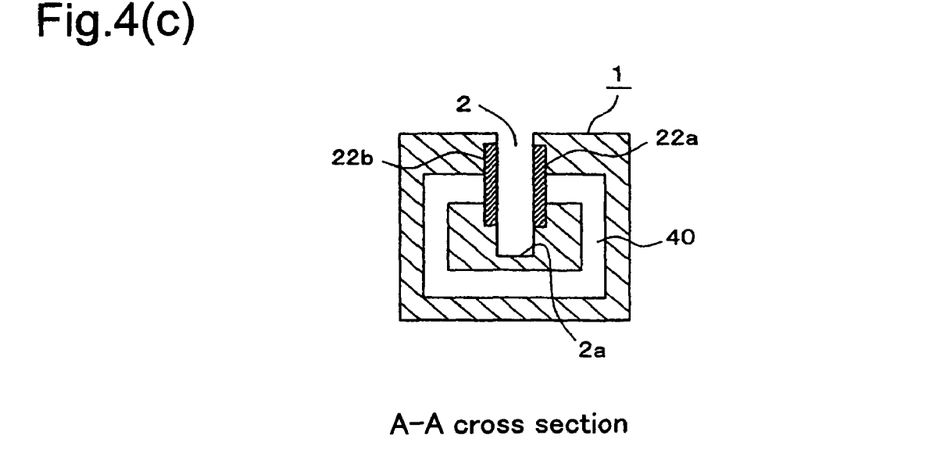

FIG. 4 is an illustration showing the structure of the main section in the card reader 100. FIG. 4(a) is a top view of the card reader 100, FIG. 4(b) is a front view thereof, and FIG. 4(c) is a side view of FIG. 4(b) in A-A cross section. In the drawings, components identical to those in FIG. 1 have been assigned identical symbols. A magnetic circuit 40 connects the pair of loop antennas 22a, 22b to one another. The detail of the magnetic circuit 40 will be discussed later. For convenience, in FIG. 4(a), the loop antennas 22a, 22b are drawn with solid lines, and in FIG. 4(b) the loop antennas 22a, 22b and the magnetic body 40 are drawn with solid lines.

As shown in FIG. 4(a), the loop antennas 22a, 22b are disposed in opposition to either side of the transport path 2 in proximity to the card insertion slot 3 of the transport path 2, with their respective antenna planes approximately parallel to the direction of card insertion. The magnetic head 11 is located in proximity to the center of the transport path 2, so that its distal end faces into the transport path 2. The card detecting sensor 26 is located on the opposite end from the card insertion slot 3 as seen from the magnetic head 11, and with the transport path 2 between it.????

The magnetic circuit 40 is composed of a magnetic body having low magnetic resistance. As shown in FIG. 4(c), the magnetic circuit 40 is formed with generally "U" shape. This magnetic circuit 40 is disposed straddling the loop antennas 22a, 22b, embedded within the card reader main body 1 so as to pass below the floor 2a of the transport path 2 without lying exposed in the transport path 2.

Figure 5:
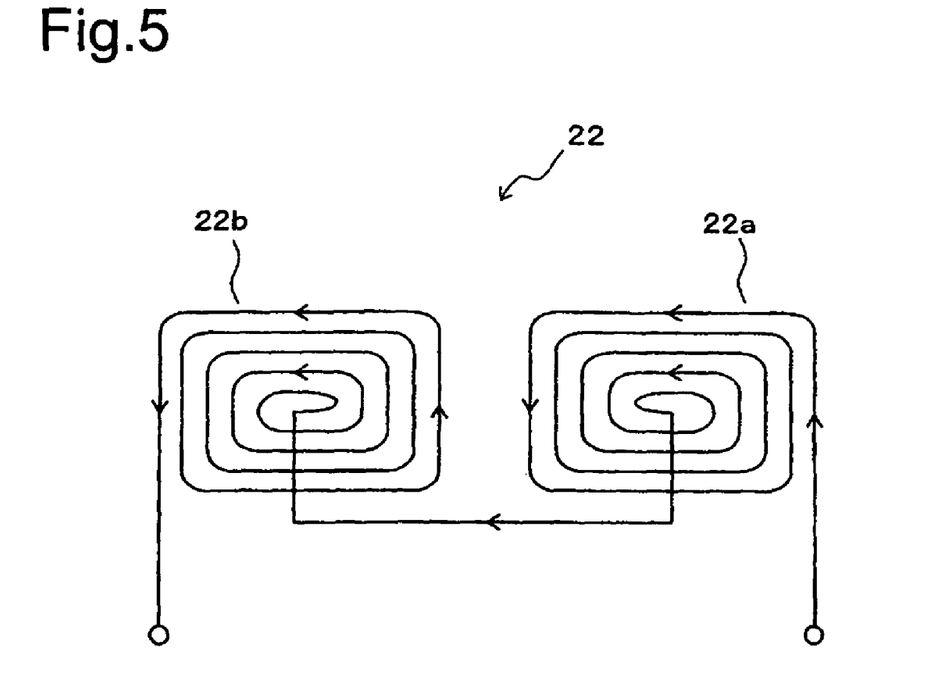
FIG. 5 is an illustration showing the general configuration of loop antennas on the card reader side.

FIG. 5 is an illustration showing the general configuration of the loop antennas 22a, 22b on the card reader side. The loop antennas 22a, 22b are respectively composed of coils wound in a plane. The loop antenna 22a and the loop antenna 22b are electrically connected so that the magnetic fluxes generated through flow of electrical current through them will have the same direction.

Figure 6:
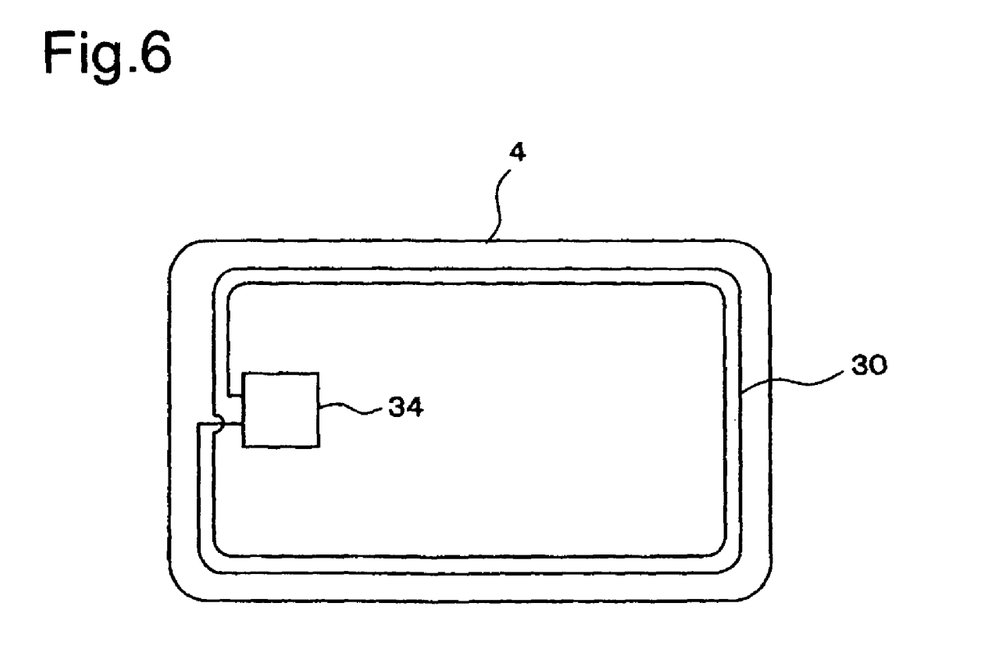
FIG. 6 is an illustration showing the general configuration of a loop antenna on the noncontact card side.

FIG. 6 is an illustration showing the general configuration of the loop antenna 30 on the noncontact card side. The loop antenna 30 is also composed of a coil wound in a plane. An IC chip 34 is electrically connected to the loop antenna 30. This IC chip 34 incorporates the send/receive unit 31 and the storage unit 32 shown in FIG. 2.

In order to read information from the noncontact card 4 using the card reader 100 described above, the noncontact card 4 is grasped with the hand, inserted into the card insertion slot 3 of the card reader 100 from the direction of the arrow in FIG. 1, and moved manually through the transport path 2 while continuing to grasp the card. By energizing the loop antennas 22a, 22b, magnetic flux traversing the transport path 2 will be generated in proximity to the card insertion slot 3, and thus starting at a time immediately after insertion of the noncontact card 4 into the card insertion slot 3. The magnetic flux formed by the loop antennas 22a, 22b will interlink with the loop antenna 30 of the 10 noncontact card 4. Electromotive force will be produced thereby in the loop antenna 30 through electromagnetic induction, and this electromotive force will be applied to the IC chip 34 activating the send/receive unit 31. As a result, sending and receiving of data will take place between the loop antennas 22a, 22b and the loop antenna 30. The card information stored in the storage unit 32 of the noncontact card 4 will be read by the card reader 100. The read out information will initially be stored in the storage unit 24. Where the card has a magnetic stripe 33 as shown in FIG. 2, the information recorded on the magnetic stripe 33 will be read by the magnetic head 11 in the course of the card moving through the transport path 2.

After the information has been read from the noncontact card 4, as the noncontact card 4 continues to be moved manually and the noncontact card 4 is now detected by the card detecting sensor 26, the CPU 21 of the card reader 100 will execute a prescribed process on the basis of the read information. For example, the CPU 21 may carry out a process to send the read information or a prescribed command to a higher level device.

Figure 7A:
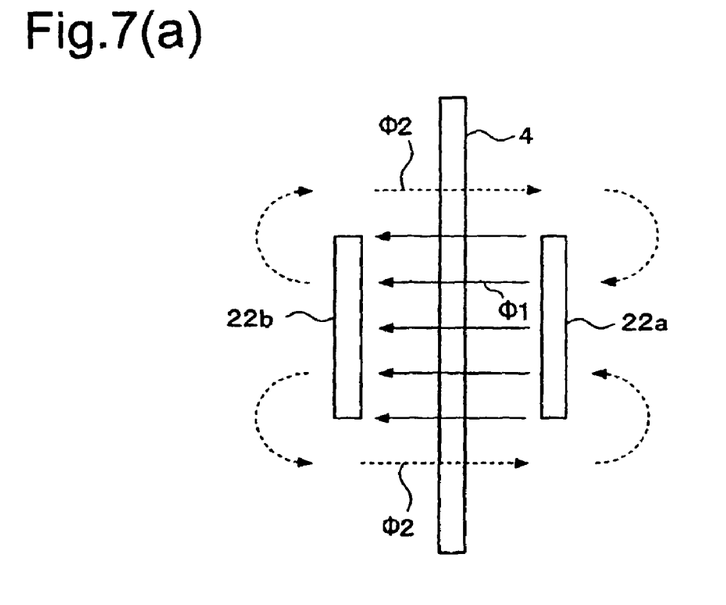

Next, the function of the magnetic circuit 40 will be described with reference to FIG. 7. FIG. 7(a) is a diagram showing magnetic flux distribution by the loop antennas 22a, 22b in the absence of the magnetic circuit 40. As shown in the drawing, where the pair of loop antennas 22a, 22b have been positioned in opposition such that the generated magnetic fluxes have the same direction, the magnetic fluxes interlinking with the noncontact card 4 will include inner magnetic flux $\Phi 1$ going from the loop antenna 22a to 22b, as well as outer magnetic flux $\Phi 2$ going from the loop antenna 22b to 22a. Since this outer magnetic flux $\Phi 2$ acts in the opposite direction from the inner magnetic flux $\Phi 1$, localized canceling out of the inner magnetic flux $\Phi 1$ will occur and magnetic flux interlinking with the noncontact card 4 will weaken. Thus, transmission efficiency in communication between the loop antennas 22a, 22b and the noncontact card 4 will drop, and in some instances card information may not be read correctly.

Figure 7B:
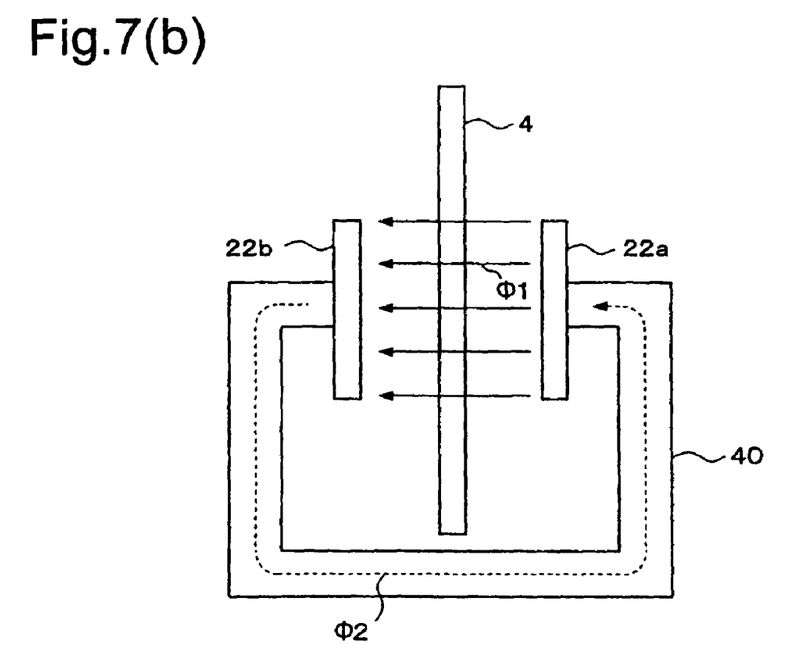

On the other hand, where a magnetic circuit 40 of low magnetic resistance connecting the loop antennas 22a, 22b is provided as shown in FIG. 7(b), magnetic flux $\Phi 2$ attempting to travel from the loop antenna 22b to 22a will be guided into the magnetic circuit 40. As shown in FIG. 4(*c*), since the magnetic circuit 40 is disposed so as to detour below the transport path 2, the magnetic flux Φ2 passing through the magnetic circuit 40 will not interlink with the noncontact card 4. Consequently, the magnetic flux Φ1 interlinking with the noncontact card 4 will not be weakened by the magnetic flux Φ2 traveling in the opposite direction, and thus transmission efficiency between the loop antennas 22*a*, 22*b* and the noncontact card 4 will be improved, and card information can be read correctly through more stable communication.

A feature of the embodiment discussed above is that the loop antennas 22*a*, 22*b* are located in proximity to the card insertion slot 3 of the transport path 2, with the magnetic circuit 40 connecting them being arranged so as to not lie exposed in the transport path 2. In the case of the swipe card reader 100 discussed above, since card transport speed is slow in the initial stage of insertion of the noncontact card 4 through the card insertion slot 3, by locating the loop antennas 22*a*, 22*b* in proximity to the card insertion slot 3, communication between the loop antennas 22*a*, 22*b* on the card reader 100 side and the loop antenna 30 on the noncontact card 4 side can take place with the card moving at slow speed. Thus, the state of communication between the two will be stable, and information recorded on the noncontact card 4 can be read accurately, even if the loop antennas 22*a*, 22*b* on the card reader 100 side are small. Additionally, by connecting the loop antennas 22*a*, 22*b* through a magnetic circuit 40 which does not lie exposed in the transport path 2, of the magnetic fluxes produced in two directions with respect to the noncontact card 4 from the loop antennas 22*a*, 22*b*. One flux Φ2 will be diverted through the magnetic circuit 40 without interlinking to the card, and thus magnetic flux interlinking with the card will be constituted by magnetic flux Φ1 in one direction only, thereby avoiding weakening of the interlinked magnetic flux. Thus, high transfer efficiency is achieved and, coupled with the fact that communication takes place with the card moving at slow speed as mentioned above. It is possible for communication to take place in a reliable manner even where small loop antennas 22*a*, 22*b* are used. Furthermore, since there are no limitations as to the noncontact card 4 transport direction or structure of the transport path 2, implementation is possible generally in a wide range of manual noncontact card readers.

Moreover, in the present embodiment, the card detecting sensor 26 is provided for detecting that the manually transported noncontact card 4 has reached a prescribed location. On the condition that the card detecting sensor 26 has detected the noncontact card 4, a prescribed process is executed on the basis of information read by the loop antennas 22*a*, 22*b*. Consequently, the device (e.g. an electronic lock) will not operate at the point in time that the card information is read, immediately following insertion of the noncontact card 4 into the card insertion slot 3. However, the device will instead operate at the point in time that the noncontact card 4 has been transported manually to a fixed location, thereby avoiding the disorientation associated with a device that operates instantaneously when the noncontact card 4 is inserted into the card insertion slot 3. Therefore, the noncontact card 4 can be operated in a manner that is not perceptibly different from a conventional magnetic card.

Figure 8A:
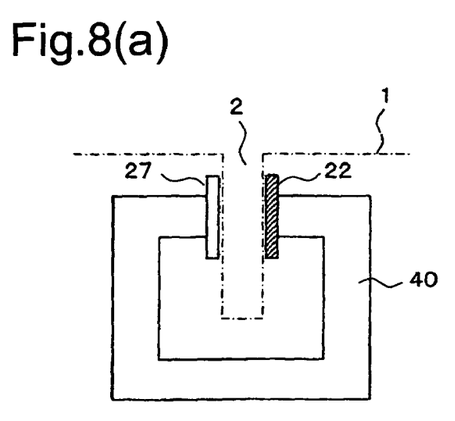
Figure 8B:
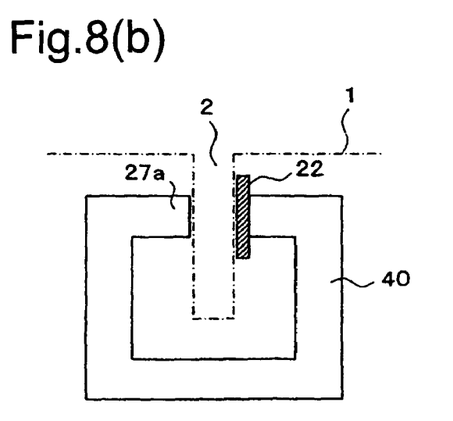

FIG. 8 depicts other embodiments of the present invention, and corresponds to FIG. 4(*c*). In the preceding embodiment, there was shown an example of disposing a pair of loop antennas 22*a*, 22*b* to either side of the transport path 2. In the embodiment of FIG. 8(*a*), however, the loop antenna 22 is provided to one side of the transport path 2, while a magnetic body 27 is provided to the other side. The magnetic circuit 40 which connects the loop antenna 22 and the magnetic body 27 is disposed so as to not lie exposed in the transport path 2. In the embodiment of FIG. 8(*b*), the end 27 of the magnetic circuit 40 functions also as a magnetic body, making the magnetic body 27 such as that shown in FIG. 8(*a*) unnecessary.

In the embodiments of FIG. 8 as well, magnetic flux interlinking with the card is produced in the transport path 2 between the loop antenna 22 and the magnetic body 27 (27*a*), and thus by locating the loop antenna 22 and the magnetic body 27 (27*a*) in proximity to the card insertion slot 3, recorded information on the card can be read accurately through stable communication in a state of slow card speed during the initial stage of card insertion. Additionally, since the loop antenna 22 and the magnetic body 27 are connected by a magnetic circuit 40 which does not lie exposed in the transport path 2, magnetic flux produced in the direction opposite to the magnetic flux from the loop antenna 22 towards the magnetic body 27 will be diverted through the magnetic circuit 40 and will not interlink with the card. Consequently, the interlinking magnetic flux will not be weakened; and high transfer efficiency will be achieved even if the antenna 22 and the magnetic body 27 are small in size, making stable communication possible. Furthermore, since there are no limitations as to the noncontact card 4 transport direction or structure of the transport path 2, implementation is possible generally in a wide range of manual noncontact card readers.

Figure 9A:
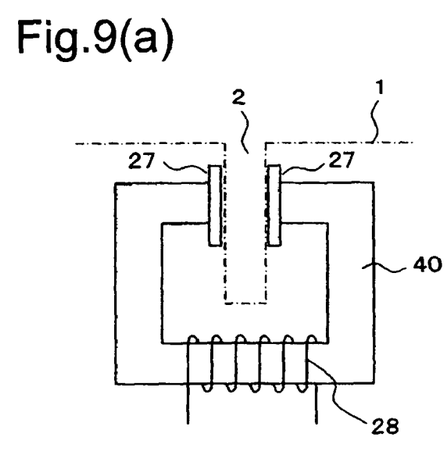
Figure 9B:
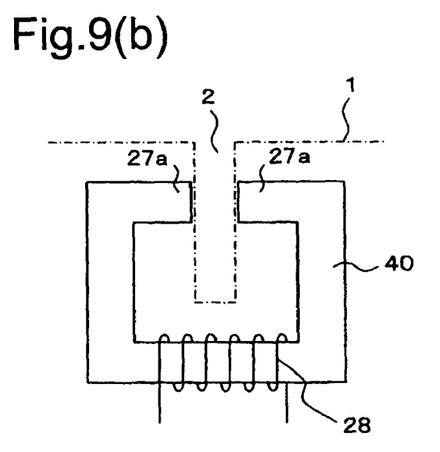

FIG. 9 depicts other embodiments of the present invention, and shows modification examples of FIG. 8. In the embodiments of FIG. 8, the loop antenna 22 and a magnetic body 27 (27*a*) are disposed to either side of the transport path 2. In the embodiment of FIG. 9(*a*), a pair of magnetic bodies 27 are disposed to either side of the transport path 2 with the magnetic circuit 40 connecting the magnetic bodies 27 arranged so as to not lie exposed in the transport path 2, and a coil 28 which forms a magnetic field between the magnetic bodies 27 is wound onto a section of the magnetic circuit 40. In the embodiment of FIG. 9(*b*), the two ends 27*a* of the magnetic circuit 40 function also as magnetic bodies, making the magnetic bodies 27 shown in FIG. 9(*a*) unnecessary.

In the embodiments of FIG. 9 as well, magnetic flux interlinking with the card is formed in the transport path 2 between the magnetic bodies 27 (27*a*), and thus by locating the magnetic bodies 27 (27*a*) in proximity to the card insertion slot 3, recorded information on the card can be read accurately through stable communication in a state of slow card speed during the initial stage of card insertion. Additionally, since the magnetic body 27 (27*a*) and the coil 28 are connected by a magnetic circuit 40 which does not lie exposed in the transport path 2, by the same principle as in the case of FIG. 8 magnetic flux will be diverted 8 and weakening of interlinking magnetic flux will be avoided. Thus, high transfer efficiency will be achieved even if the coil 28 and the magnetic body 27 are small in size, making stable communication possible. Furthermore, since there are no limitations as to the noncontact card 4 transport direction or structure of the transport path 2, implementation is possible generally in a wide range of manual noncontact card readers.

Figure 10:
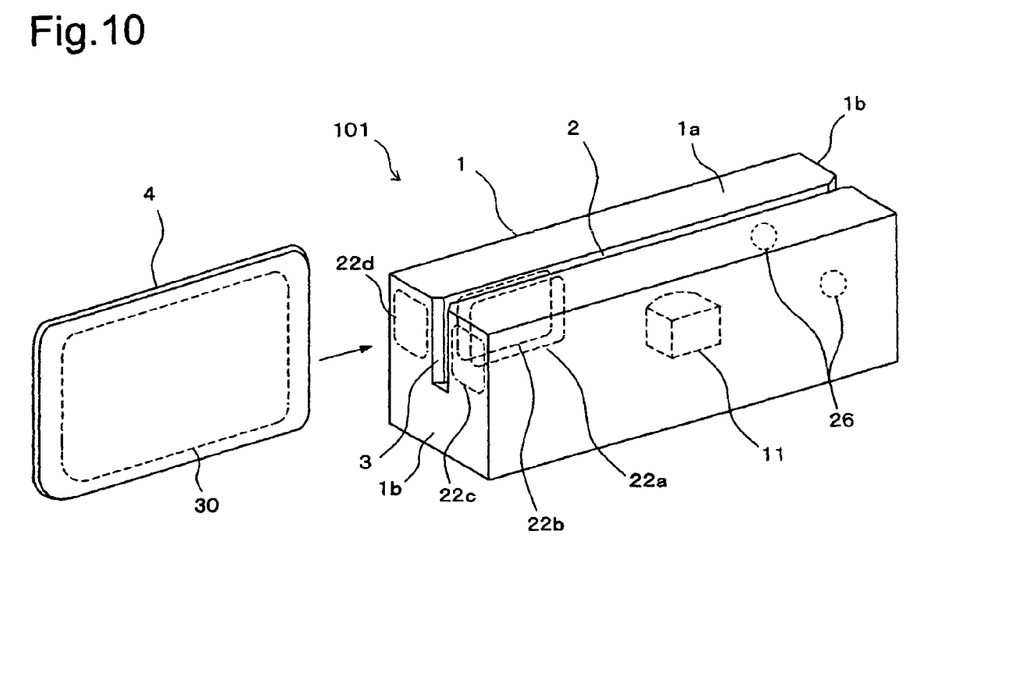
FIG. 10 is a perspective view showing a card reader pertaining to another embodiment of the present invention.

FIG. 10 shows a card reader 101 pertaining to yet another embodiment of the present invention. In FIG. 10, components identical to those in FIG. 1 have been assigned identical symbols. In the present embodiment, in addition to the loop antennas 22*a*, 22*b* to either side of the transport path 2 in FIG. 1, there is provided another pair of loop antennas 22*c*, 22*d* disposed to either side of the card insertion slot 3. These loop antenna 22*c*, 22*d* are disposed with the antenna plane approximately perpendicular to the card insertion direction (direction of the arrow). The configuration is otherwise the same as in FIG. 1. With this card reader 101 as well, it is possible to use the magnetic card 4a of FIG. 2(a) or the hybrid card 4b of FIG. 2(b), in addition to the noncontact card 4. Also, the electrical block diagrams of the card reader 101 and the noncontact card 4 are substantially identical to those of FIG. 3; and the antenna 22 of FIG. 3 includes the loop antennas 22a, 22b and the loop antennas 22c, 22d.

Figure 11:
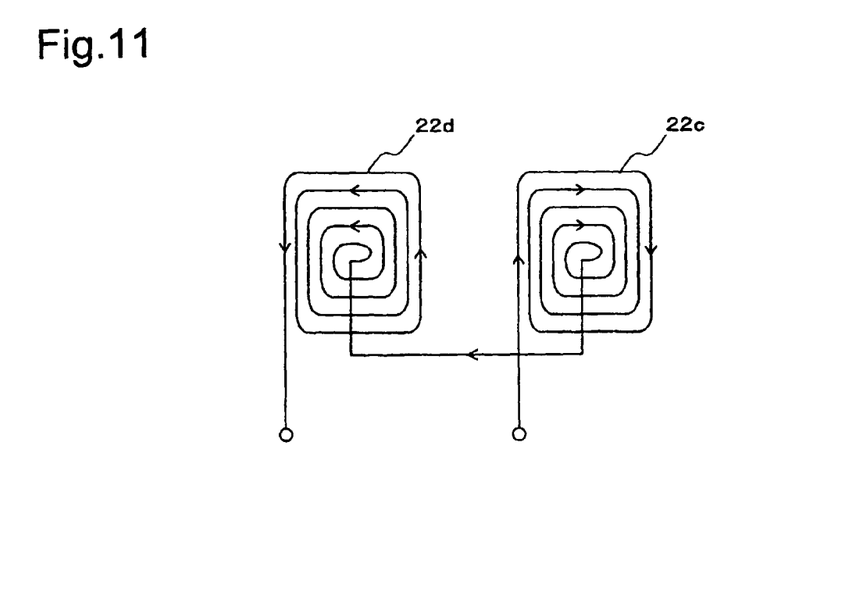
FIG. 11 is an illustration showing the general configuration of loop antennas.

FIG. 11 is an illustration showing the general configuration of the loop antennas 22c, 22d. The loop antennas 22c, 22d are constituted by coils respectively wound in a plane. The loop antenna 22c and the loop antenna 22d are electrically connected so that the magnetic fluxes generated through flow of electrical current through them are opposite in direction. That is, the loop antennas 22c, 22d are driven at mutually opposite phase. The loop antennas 22a, 22b, on the other hand, are electrically connected so that the magnetic fluxes generated through flow of electrical current through them are the same in direction, as in the case of FIG. 1. That is, the loop antennas 22a, 22b are driven at mutually identical phase. The loop antennas 22a, 22b and the loop antennas 22c, 22b are electrically connected in series or in parallel. The loop antenna of the noncontact card is identical to that shown in FIG. 6.

FIG. 12 is an illustration showing the structure of the main section in the card reader 101. FIG. 12(a) is a top view of the card reader 101, FIG. 12(b) is a front view thereof, FIG. 12(c) is a side view of (b) in A-A cross section, and FIG. 12(d) is a side view of (b) in B-B cross section. In the drawings, components identical to those in FIG. 10 have been assigned identical symbols. A magnetic circuit connects the pair of loop antennas 22a, 22b to one another. A magnetic circuit 50 connects the pair of loop antennas 22c, 22d to one another. For convenience, in FIG. 12(a), the loop antennas 22a through 22d are drawn with solid lines; and in FIG. 12(b) the loop antennas 22a through 22d and the magnetic bodies 40, 50 are drawn with solid lines.

Figure 12A:
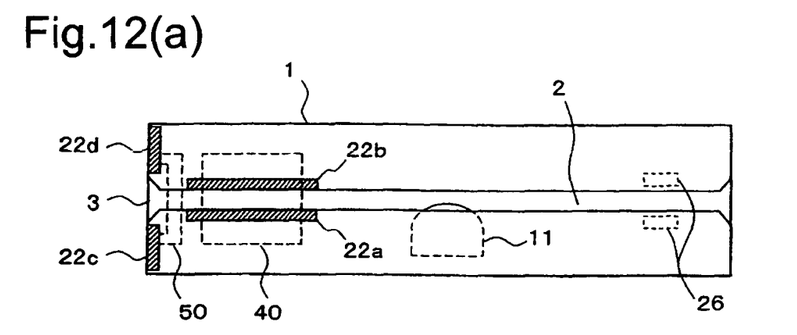
Figure 12B:
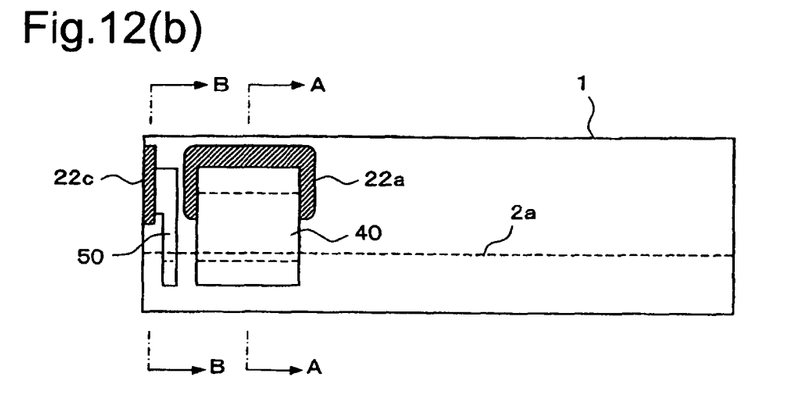

As shown in FIG. 12(a), the loop antennas 22a, 22b are disposed in opposition to either side of the transport path 2 in proximity to the card insertion slot 3 of the transport path 2, with their respective antenna planes approximately parallel to the direction of card insertion. The magnetic head 11 is located in proximity to the center of the transport path 2, so that its distal end faces into the transport path 2. The card detecting sensor 26 is located on the opposite end from the card insertion slot 3 as seen from the magnetic head 11, and with the transport path 2 between it. These components are the same as in the embodiment of FIG. 4. On the other hand, as mentioned previously, the pair of loop antennas 22c, 22d is disposed to either side of the card insertion slot 3, with their respective antenna planes approximately perpendicular to the direction of card insertion.

Figure 12C:
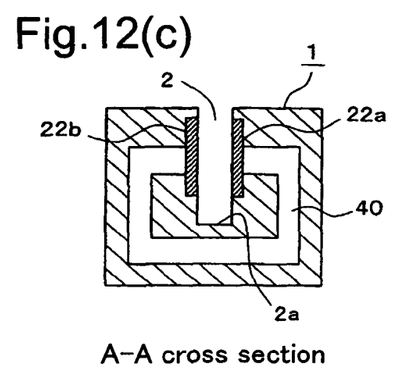
Figure 12D:
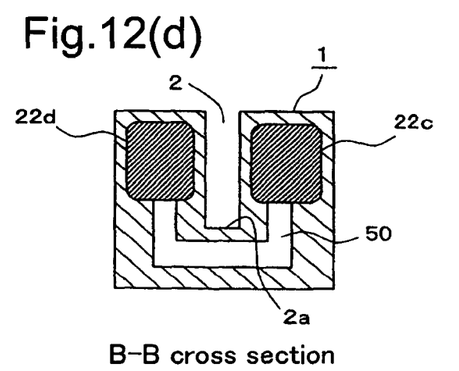

The magnetic circuit 40 is composed of a magnetic body having low magnetic resistance; as shown in FIG. 12(c), it is formed with generally "U" shape. This magnetic circuit 40 is disposed straddling the loop antennas 22a, 22b, embedded within the card reader main body 1 so as to pass below the floor 2a of the transport path 2 without lying exposed in the transport path 2. This structure is identical to that of FIG. 4(c). The magnetic circuit 50 is also composed of a magnetic body having low magnetic resistance. As shown in FIG. 12(d), the magnetic circuit 50 is formed with generally "U" shape. This magnetic circuit 50 is disposed straddling the loop antennas 22c, 22d, embedded within the card reader main body 1 so as to pass below the floor 2a of the transport path 2 without lying exposed in the transport path 2.

In order to read information from the noncontact card 4 using the card reader 101 described above, the noncontact card 4 is grasped with the hand, inserted into the card insertion slot 3 of the card reader 101 from the direction of the arrow in FIG. 10, and moved manually through the transport path 2 while continuing to grasp the card. By energizing the loop antennas 22c, 22d, magnetic flux will be generated to the front of the card insertion slot 3. By energizing the loop antennas 22a, 22b, magnetic flux traversing the transport path 2 will be generated in proximity to the card insertion slot 3. Thus, magnetic flux generated by the loop antennas 22c, 22b will interlink with the loop antenna 30 of the noncontact card 4 substantially simultaneously with insertion of the noncontact card into the card insertion slot 3; subsequently, the magnetic flux formed by the loop antennas 22a, 22b will interlink with the loop antenna 30 of the noncontact card 4. Electromotive force will be produced thereby in the loop antenna 30 through electromagnetic induction, and this electromotive force will be applied to the IC chip 34, activating the send/receive unit 31. As a result, sending and receiving of data will take place between the loop antennas 22a through 22d and the loop antenna 30, and the card information stored in the storage unit 32 of the noncontact card 4 will be read by the card reader 101. The read out information will initially be stored in the storage unit 24. Where the card has a magnetic stripe 33 as shown in FIG. 2, the information recorded on the magnetic stripe 33 will be read by the magnetic head 11 in the course of the card moving through the transport path 2.

After the information has been read from the noncontact card 4, as the noncontact card 4 continues to be moved manually and the noncontact card 4 is now detected by the card detecting sensor 26, the CPU of the card reader 101 will execute a prescribed process on the basis of the read information. For example, the CPU may carry out a process to send the read information or a prescribed command to a higher level device.

Figure 13A:
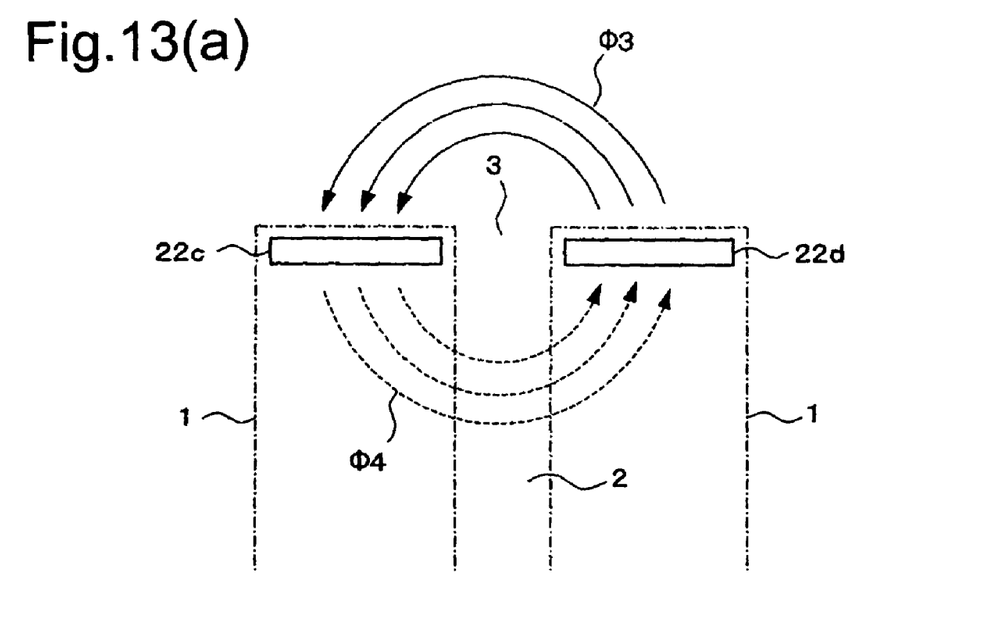

Next, the function of the magnetic circuit 50 will be described with reference to FIG. 13. The function of the magnetic circuit 40 is the same as shown in FIG. 7 and need not be discussed here. FIG. 13(a) is a diagram showing magnetic flux distribution by the loop antennas 22c, 22d in the absence of the magnetic circuit 50. As shown in the drawing, where the pair of loop antennas 22c, 22d have been positioned in parallel such that the generated magnetic fluxes have opposite directions, the magnetic fluxes interlinking with the noncontact card 4 will include outer magnetic flux Φ3 going from the loop antenna 22d to 22c, as well as inner magnetic flux Φ4 going from the loop antenna 22c to 22d. Since this inner magnetic flux Φ4 acts in the opposite direction from the outer magnetic flux Φ3, localized canceling out of the outer magnetic flux Φ3 will occur and magnetic flux interlinking with the noncontact card 4 will weaken. Thus, transmission efficiency in communication between the loop antennas 22c, 22d and the noncontact card 4 will drop, and in some instances card information may not be read correctly.

Figure 13B:
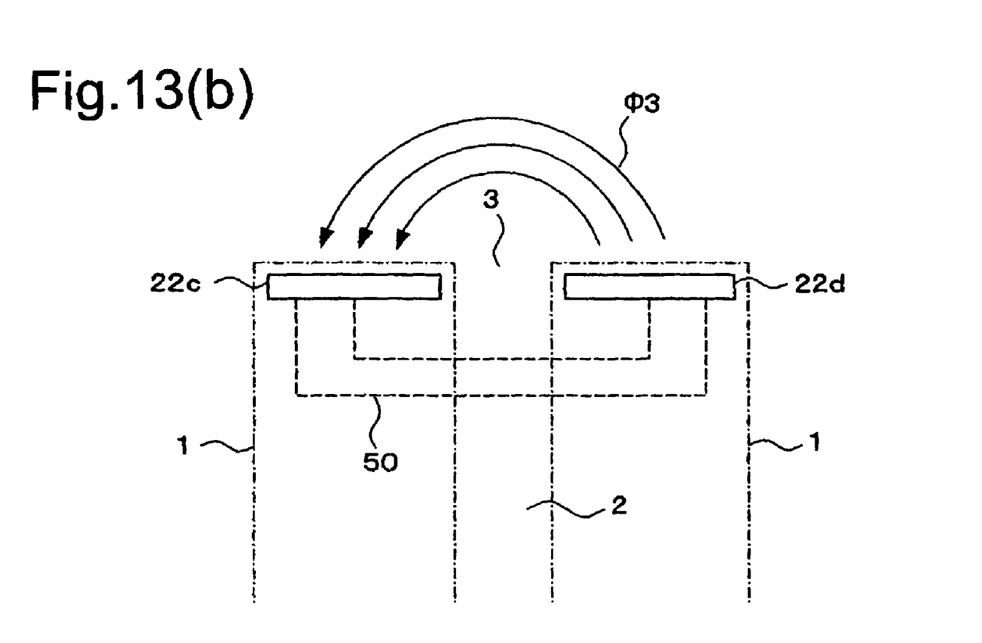

On the other hand, where a magnetic circuit 50 of low magnetic resistance connecting the loop antennas 22c, 22d is provided as shown in FIG. 13(b), all magnetic flux attempting to travel from the loop antenna 22c to 22d will be guided into the magnetic circuit 50. As shown in FIG. 12(d), since this magnetic circuit 50 is disposed so as to detour below the transport path 2, the magnetic flux passing through the magnetic circuit 50 will not interlink with the noncontact card 4. Consequently, the magnetic flux Φ3 interlinking with the noncontact card 4 will not be weakened by the magnetic flux Φ4 traveling in the opposite direction, and thus transmission efficiency between the loop antennas 22c, 22d and the noncontact card 4 will be improved, and card information can be read correctly through more stable communication.

A feature of the embodiment discussed above is that first loop antennas 22c, 22d are located to either side of the card insertion slot 3, while second loop antennas 22a, 22b are located in proximity to the card insertion slot 3 of the transport path 2, with the magnetic circuits 40, 50 which connect the respective pairs of loop antennas to one another being arranged so as to not lie exposed in the transport path 2. As mentioned above, since card transport speed is slow in the initial stage of card insertion, a longer communication interval can be assured by initiating communication with the card while in proximity to the card insertion slot 3. Thus, by locating the loop antennas 22c, 22d to either side of the card insertion slot 3 and generating to the front of the card insertion slot 3 magnetic flux for interlinking with the noncontact card 4, communication time of sufficient duration is assured, and more stable communication can take place. Furthermore, since loop antennas are disposed respectively to either side of the card insertion slot 3 and in proximity to the card insertion slot 3 of the transport path 2, the magnetic fields generated by the loop antennas 22a through 22d will be strong, and high transfer efficiency with the noncontact card 4 can be achieved even where the antennas are small in size.

Additionally, by connecting the loop antennas 22a, 22b through a magnetic circuit 40 which does not lie exposed in the transport path 2, as shown in FIG. 7, of the magnetic fluxes produced in two directions with respect to the noncontact card 4 from the loop antennas 22a, 22b, one flux Φ2 will be diverted through the magnetic circuit 40 without interlinking to the card, and thus magnetic flux interlinking with the card will be constituted by magnetic flux Φ1 in one direction only, thereby avoiding weakening of the interlinked magnetic flux. Thus, high transfer efficiency will be achieved, and it will be possible for communication to take place in a reliable manner, even where the loop antennas 22a, 22b on the card reader 101 side are small in size.

Similarly, by connecting the loop antennas 22c, 22d through a magnetic circuit 50 which does not lie exposed in the transport path 2, as shown in FIG. 13, of the magnetic fluxes produced in two directions with respect to the noncontact card 4 from the loop antennas 22c, 22d, one flux Φ4 will be diverted through the magnetic circuit 50 without interlinking to the card, and thus magnetic flux interlinking with the card will be constituted by magnetic flux Φ3 in one direction only, thereby avoiding weakening of the interlinked magnetic flux. Thus, high transfer efficiency will be achieved, and it will be possible for communication to take place in a reliable manner, even where the loop antennas 22c, 22d on the card reader 101 side are small in size.

Moreover, in card reader 101 of the present embodiment, as in the preceding embodiments, a card detecting sensor 26 is provided for detecting that the manually transported noncontact card 4 has reached a prescribed location; and on the condition that the card detecting sensor 26 has detected the noncontact card 4, a prescribed process is executed on the basis of information read by the loop antennas 22a through 22d. Consequently, the device (e.g. an electronic lock) will not operate at the point in time that the card information is read, immediately following insertion of the noncontact card 4 into the card insertion slot 3. However, the device will instead operate at the point in time that the noncontact card 4 has been transported manually to a fixed location, thereby avoiding the disorientation associated with a device that operates instantaneously when the noncontact card 4 is inserted into the card insertion slot 3. Therefore, the noncontact card 4 can be operated in a manner that is not perceptibly different from a conventional magnetic card. Furthermore, in the present embodiment, since there are no limitations as to the noncontact card 4 transport direction or structure of the transport path 2, implementation is possible generally in a wide range of manual noncontact card readers.

Figure 14:
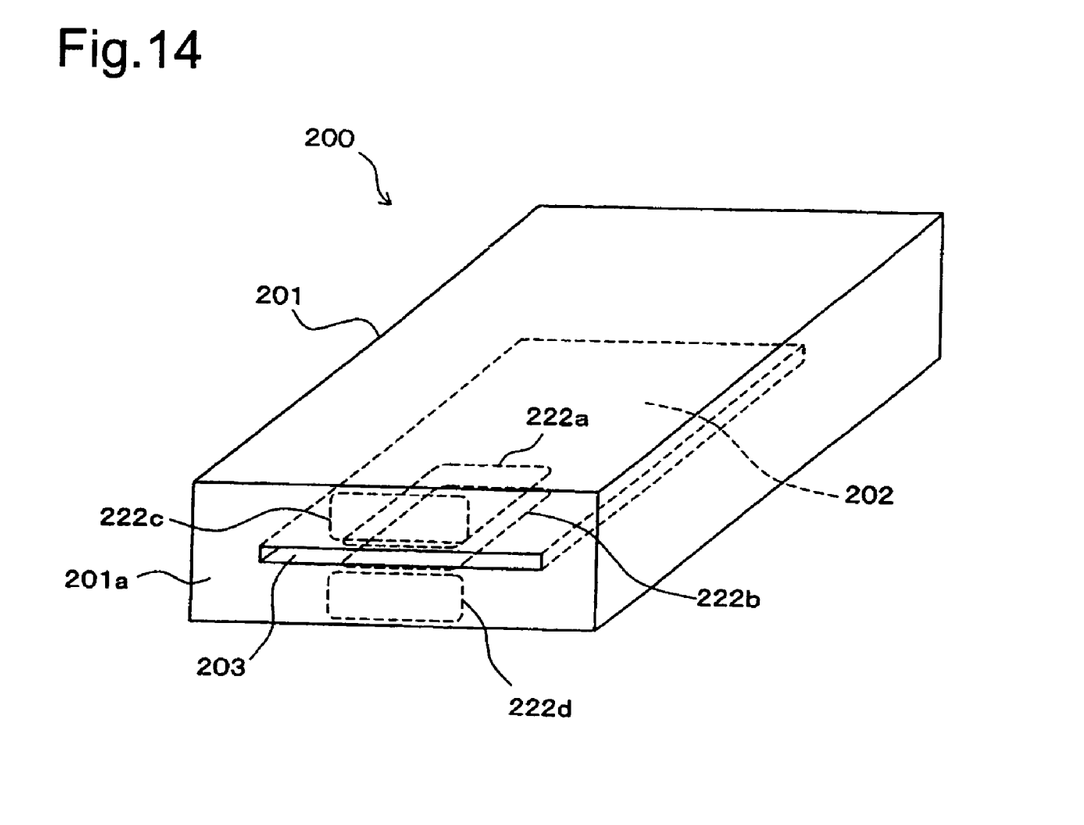
FIG. 14 is a perspective view showing a card reader pertaining to another embodiment of the present invention.

The embodiments of FIG. 8 and FIG. 9 can be implemented in the card reader 101 described above as well. FIG. 14 is a perspective view showing an insertion type card reader 200 pertaining to another embodiment of the present invention. 201 denotes the main body of the card reader 101. A card insertion slot 203 is provided on one end face thereof. A card identical to the card 4, 4a, or 4b shown in FIG. 1 or FIG. 2 is inserted into the card insertion slot 203. 202 denotes the transport path of the inserted card. A pair of loop antennas 222a, 222b is disposed in opposition to either side of the transport path 202, in proximity to the card insertion slot 203 of this transport path 202. The antenna planes of these loop antennas 222a, 222b are approximately parallel to the card insertion direction. Another pair of loop antennas 222c, 222d is disposed to either side of the card insertion slot 203. The antenna planes of these loop antennas 222c, 222d are approximately perpendicular to the card insertion direction. As in the embodiment of FIG. 10, the loop antennas 222a, 222b are electrically connected so that the magnetic fluxes generated through flow of electrical current through them will have the same direction, while the loop antennas 222c, 222d are electrically connected so that the magnetic flux generated through flow of electrical current through them will have opposite direction. In FIG. 14, the magnetic head and card detecting sensor have been omitted from the illustration.

Implementation of the present invention in the insertion type card reader 200 shown here affords working effects similar to those with the swipe type card readers 100, 101. The embodiments of FIG. 8 and FIG. 9 can be implemented in the card reader 200 described above as well.

The embodiments shown hereinabove are merely exemplary and should not be construed as limiting the present invention. For example, whereas in the preceding embodiments the magnetic circuits 40, 50 were composed of separate magnetic bodies, a single magnetic body could function concomitantly as the magnetic circuits 40, 50. Also, while the preceding embodiments described examples in which a magnetic head 11 is provided to enable reading of a card having a magnetic stripe 33 as shown in FIG. 2, the magnetic head 11 is not an essential element of the present invention, and it would be possible to dispense with the magnetic head 11 to make a card reader for exclusive use with noncontact cards. In FIG. 3, the decoder 12 is connected directly to a higher level device, but a configuration in which the decoder 12 is connected to a higher level device via the CPU 21 would be possible as well.

What is claimed is:

1. An electromagnetic induction-type card reader comprising:
   a card insertion slot for inserting a noncontact card;
   a transport path through which is manually transported a noncontact card inserted into the card insertion slot;
   a reading module for noncontact reading of information recorded on the noncontact card, and that includes a pair of loop antennas disposed in opposition to either side of the transport path in proximity to the card insertion slot of the transport path; and
   a magnetic circuit connecting the loop antennas and being composed of a generally U-shaped magnetic body with low magnetic resistance is located so as to not lie exposed in the transport path.

2. The electromagnetic induction-type card reader according to claim 1 further comprising:
   a detector disposed on the transport path, for detecting that a manually transported noncontact card has reached a prescribed location; and
   an implementing module that implements a prescribed process on the basis of information read by the reading module, on the condition that the detector has detected a noncontact card.

3. The electromagnetic induction-type card reader according to claim 1 further comprising:
   a detector disposed on the transport path, for detecting that a manually transported noncontact card has reached a prescribed location; and an implementing module that implements a prescribed process on the basis of information read by the reading module, on the condition that the detector has detected a noncontact card.

4. An electromagnetic induction-type card reader comprising:
   a card insertion slot for inserting a noncontact card;
   a transport path through which is manually transported a noncontact card inserted into the card insertion slot; and
   a reading module for noncontact reading of information recorded on the noncontact card, and that includes a pair of first loop antennas disposed to either side of the card insertion slot with the antenna plane approximately perpendicular to the card insertion direction;
   a pair of second loop antennas disposed in opposition to either side of the transport path in proximity to the card insertion slot of the transport path; and
   magnetic circuits respectively being composed of a generally U-shaped magnetic body with low magnetic resistance and connecting the first loop antennas to one other and the second loop antennas to one other are located so as to not lie exposed in the transport path.

5. The electromagnetic induction-type card reader according to claim 4 wherein the first loop antennas are driven in mutually opposite phase each other.

6. The electromagnetic induction-type card reader according to claim 5 further comprising:
   a detector disposed on the transport path, for detecting that a manually transported noncontact card has reached a prescribed location; and
   an implementing module that implements a prescribed process on the basis of information read by the reading module, on the condition that the detector has detected a noncontact card.

7. The electromagnetic induction-type card reader according to claim 4 further comprising:
   a detector disposed on the transport path, for detecting that a manually transported noncontact card has reached a prescribed location; and
   an implementing module that implements a prescribed process on the basis of information read by the reading module, on the condition that the detector has detected a noncontact card.

8. The electromagnetic induction-type card reader according to claim 4 further comprising:
   a detector disposed on the transport path, for detecting that a manually transported noncontact card has reached a prescribed location; and
   an implementing module that implements a prescribed process on the basis of information read by the reading module, on the condition that the detector has detected a noncontact card.

9. An electromagnetic induction-type card reader comprising:
   a card insertion slot for inserting a noncontact card;
   a transport path through which is manually transported a noncontact card inserted into the card insertion slot;
   a reading module for noncontact reading of information recorded on the noncontact card, and that includes a loop antenna and a generally U-shaped magnetic body with low magnetic resistance disposed in opposition to either side of the transport path in proximity to the card insertion slot of the transport path; and
   a magnetic circuit connecting the loop antenna and the magnetic body is located so as to not lie exposed in the transport path.

10. An electromagnetic induction-type card reader comprising:
   a card insertion slot for inserting a noncontact card;
   a transport path through which is manually transported a noncontact card inserted into the card insertion slot;
   a reading module for noncontact reading of information recorded on the noncontact card, and that includes a pair of generally U-shaped magnetic bodies with low magnetic resistance disposed in opposition to either side of the transport path in proximity to the card insertion slot of the transport path;
   a coil for generating a magnetic field between the magnetic bodies; and
   a magnetic circuit connecting the coil and the magnetic bodies is located so as to not lie exposed in the transport path.

* * * * *